ERROR CORRECTING MEANS FOR DIGITAL TRANSMISSION SYSTEMS

Filed Dec. 24, 1968 4 Sheets-Sheet 1

ERROR CORRECTING MEANS FOR DIGITAL TRANSMISSION SYSTEMS

Filed Dec. 24, 1968 4 Sheets-Sheet 2

March 10, 1970 J. L. MASSEY 3,500,320

ERROR CORRECTING MEANS FOR DIGITAL TRANSMISSION SYSTEMS

Filed Dec. 24, 1968 4 Sheets-Sheet 3

United States Patent Office 3,500,320
Patented Mar. 10, 1970

3,500,320

ERROR CORRECTING MEANS FOR DIGITAL TRANSMISSION SYSTEMS

James Lee Massey, South Bend, Ind., assignor to Codex Corporation, Watertown, Mass., a corporation of Delaware Continuation-in-part of application Ser. No. 488,686, Sept. 20, 1965. This application Dec. 24, 1968, Ser. No. 786,635
Int. Cl. G06f *11/00;* G08b *29/00*
U.S. Cl. 340—146.1 5 Claims

ABSTRACT OF THE DISCLOSURE

Bursts of errors in convolutionally coded messages are corrected by a decoder in which a parity checking circuit determines whether selected syndrome digits which lie within the constraint length of the code form a codeword in a linear block code having as its codewords the set of all patterns of said selected syndrome digits that are consistent with any error burst pattern confined to the beginning of said constraint length, and upon the presence of such a codeword, error detecting and correcting circuitry becomes operative.

This application is a continuation-in-part of application Ser. No. 488,686, filed Sept. 20, 1965, now abandoned.

The present invention relates to the detection and correction of errors in digital data transmission systems and in particular to data systems in which the digital information is encoded in convolutional codes and in which the errors tend to occur in clustered groups or "bursts" spaced apart by error-free intervals.

One object of the invention is to provide a new and improved decoding means for error-burst-correcting convolutional codes. Another object is to provide a decoding means which is applicable to virtually all-low-redundancy error-burst-correcting convolutional codes, including all burst lengths and all digital number systems. Another object is to provide an improved means for decoding virtually all known low-redundancy error-burst-correcting convolutional codes, or modifications of these known codes which retain the same guaranteed error-burst-correcting power, with simple and inexpensive circuitry.

Other objects include providing an improved decoder means for low-redundancy error-burst-correcting convolutional codes; providing a decoder means employing only a few logic devices; and providing improved decoder means that has both a guaranteed error-burst-correcting capability and a considerable capability of correcting additional errors beyond those in the guaranteed correctable class.

Still other objects of the invention include providing a decoding means for low-redundancy error-burst-correcting convolutional codes which has predictable characteristics useful to the design engineer in matching a given decoder to a given channel; providing an improved means for controlling the decision to perform a correction; providing an improved means for resetting the syndrome digits after a correction is made; and providing the above in combination in a single decoding means.

The decoder of the present invention operates in the usual way of decoding convolutional codes insofar as decoding proceeds sequentially upon a stream of digital signals and employs the sequence of syndrome signals that are characteristic of the code and the pattern of channel errors.

According to the invention the decoder includes a parity checking circuit, operative prior to detection and correction of errors in the received data, for determining when selected syndrome digits which lie within the constraint length of the convolutional code form a vector in a linear vector space whose structure is entirely determined by the convolutional code. In more usual coding terminology, such a linear vector space is called a linear block code and a vector belonging to the linear vector space or block code is called a block codeword. According to the invention, although the parity checking circuit is utilized to determine the presence of a codeword in a particular block code, it is not for the purpose of correcting digits that have been encoded by said block code nor for the purpose of detecting errors in such digits. Rather, by detecting the presence of a codeword in said block code, the parity checking circuit serves to determine from the convolutional code syndrome digits whether possible errors in the digits to be decoded are confined to the beginning of the constraint length of the convolutional code.

The parity checking circuit, according to the invention, acts dependently with a separate error detector and corrector means operative to control the decoded values of the digits to be decoded at the beginning of the constraint length of the convolutional code only when the parity checking circuit has detected the absence of errors elsewhere in the constraint length by detecting a codeword in the block linear code dependent on the convolutional code.

Further, the decoder has means to compensate the syndrome digits of the convolutional code after corrections have been made in order to permit decoding of subsequent digits in a sequential manner.

The invention will be explained in greater detail in connection with the drawings wherein.

Figure 1:
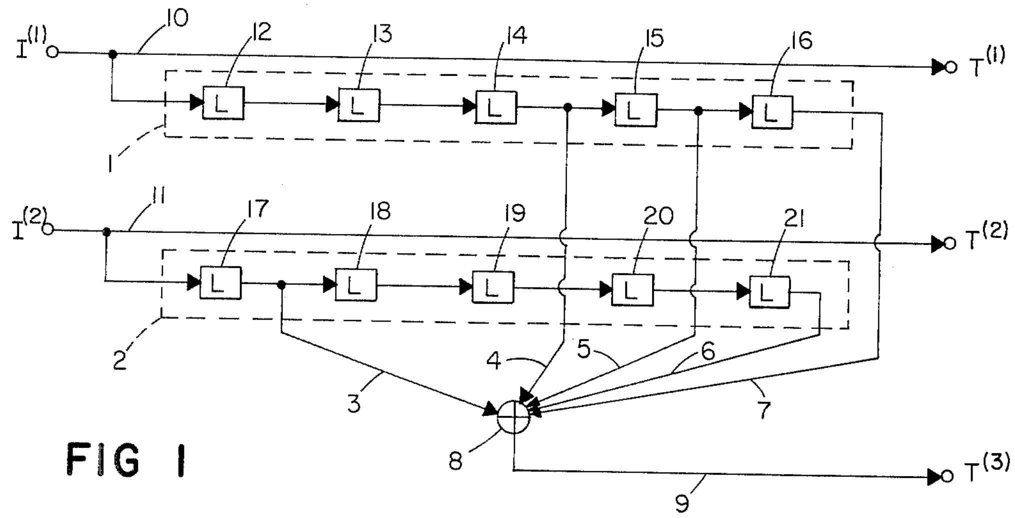
FIG. 1 is a circuit diagram of an encoder for a redundancy ⅓ interlaced binary convolutional code.

To describe the invention, reference is made to "convolutional codes" (also called "recurrent codes"), "linear block codes," "parity checks," "syndromes," "constraint length," "interfaced," "guard space," and other terms relating to digital codes. The use of these terms will be understood by persons skilled in the coding art. The reader is referred to "Error-Correcting Codes," by W. W. Peterson, The M.I.T. Press and John Wiley and Sons, Inc., 1961, the bibliography therein, and to applicant's U.S. application Ser. No. 299,534, filed Aug. 2, 1963, now issued as U.S. Patent 3,402,393.

The invention takes advantage of the following special feature of convolutional codes. In order to achieve a guaranteed error-correcting power, the taps which define the structure of such codes must be so spaced that any pair of error patterns within the desired guaranteed correctable class which have different errors in the digits at the beginning of the constraint length cannot result in the same syndrome terms within the constraint length of the code. That is to say, correctable error patterns which happen to result in the same syndrome terms over the constraint length must agree in the error values for the digits at the beginning of the constraint length.

The invention lies in the recognition that the decoder for convolutional codes can comprise two dependent logic units of particular structure to take advantage of the foregoing feature of convolutional codes. In the first or error pattern evaluating unit, the syndrome terms over the constraint length are tested to determine whether they form a possible syndrome for error patterns guaranteed correctable by the code which include errors at the beginning of the constraint length. If so, then the second or error detecting and correcting unit can take as the values of the possible errors in the digits at the beginning of the constraint length the values of these errors in any guranteed correctable error pattern which could result in this syndrome.

For example, suppose that the code taps of a convolutional code are selected to guarantee that all error-bursts confined to B or fewer time units followed by an error-free guard space are correctable. According to the invention the first step is to test the syndrome terms over the constraint length to determine whether they could be caused by an error-burst confined to B or fewer time units at the beginning of the constraint length. If so, in the second step any errors in the digits at the beginning of the constraint length are computed under the assumption that such an error-burst has actually occurred. Providing that the actual error pattern is one of the bursts of B or fewer time units with appropriate guard space following, decoding will be successful even if the actual error burst has not yet reached the beginning of the constraint length as was assumed. This follows from the feature of convolutional codes mentioned above, that all correctable error-bursts (here of length B or fewer time units) which cause the same syndrome must have the same errors in the digits at the beginning of the constraint length.

More particularly, according to the invention the error pattern evaluating unit of the decoder determines whether the syndrome terms form a codeword in the linear block code whose codewords are the linear vector space of syndromes associated with all possible error-burst patterns whose errors (if any) are confined to B or fewer time units at the beginning of the constraint length of the convolutional code. This may simply be accomplished by a block code parity checking circuit, instrumented in the binary case by modulo-two adding circuits and a single "OR" gate responsive thereto.

The error detecting and correcting unit of the decoder may comprise means for solving for the error in each digit at the beginning of the constraint length as a linear combination of syndrome terms, or, according to another feature of the invention, directly equating single syndrome terms to appropriate error terms.

Finally, according to the invention, compensation of the syndrome after errors are corrected to enable the decoding of following digits to proceed sequentially can be accomplished in certain cases by, after a correction is made, merely setting to zero the syndrome terms examined by the detecting unit of the decoder.

While the invention is not at all limited to binary convolutional codes, or codes of redundancy ⅓, or even interlaced codes, an encoder and decoder for such a code is presently preferred.

FIG. 1 illustrates an encoder for a redundancy ⅓ binary convolutional code designed for use with an error-burst channel having a maximum probable error-burst length of $B=L$ time units. L. may be any number, but frequency may exceed one hundred or one thousand in telephone or radio tropospheric scatter communication systems.

As shown, the two input streams $I^{(1)}$ and $I^{(2)}$ each of which contain one binary information signal for each of the time units 0, 1, 2, . . . are passed directly along lines 10 and 11 to form the two transmitted streams $T^{(1)}$ and $T^{(2)}$. The input streams $I^{(1)}$ and $I^{(2)}$ are also passed through respective information storage registers 1 and 2 consisting of cascades of delay devices 12, 13, 14, 15, 16 and 17, 18, 19, 20, 21 respectively, each delay device providing a delay of L time units between its input and output. Signals taken by the code taps 3, 4, 5, 6 and 7 are added by modulo-two adder 8 once each time unit to form on line 9 the signals in the transmitted redundancy stream $T^{(3)}$.

As is well known, the number and particular location along the information registers of the code taps serve to define the structure of any given convolutional code.

Figure 2:
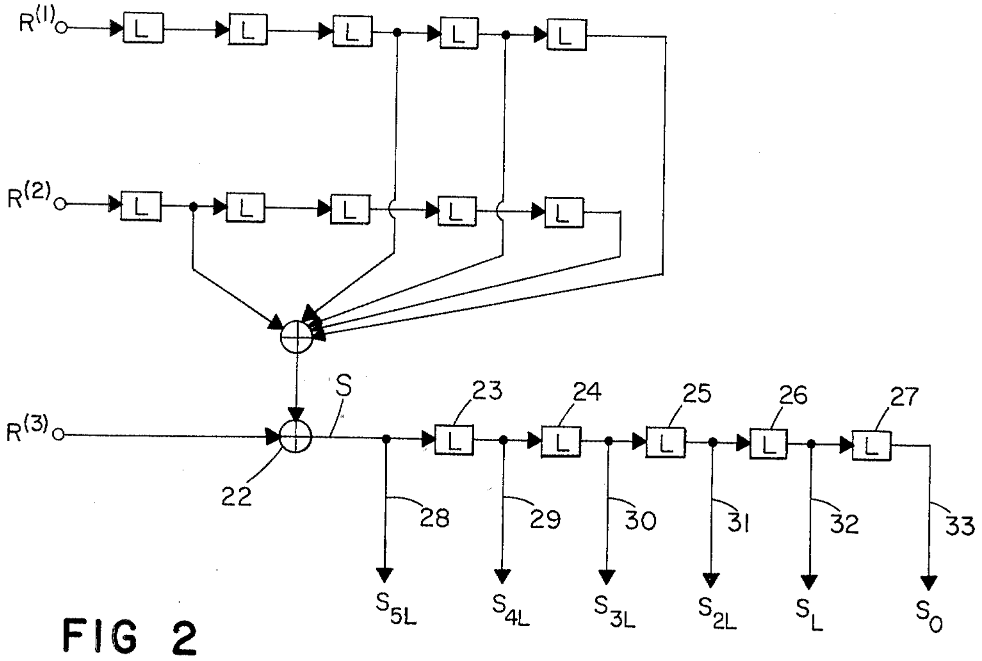
FIG. 2 is a diagram of a syndrome forming circuit for the convolutional code of FIG. 1.

FIG. 2 shows the syndrome forming circuit for the convolutional code defined by the encoder of FIG. 1. The input to this circuit consists of the three received streams $R^{(1)}$, $R^{(2)}$ and $R^{(3)}$ which may differ from the respective transmitted streams $T^{(1)}$, $T^{(2)}$ and $T^{(3)}$ because of errors that have occurred in the transmissions between the encoder output and the syndrome forming circuit. The syndrome forming circuit comprises a set of information registers and code taps exactly like those of FIG. 1 to repeat the formation of the redundancy signals, but using the received information streams $R^{(1)}$ and $R^{(2)}$. The redundancy signals thus formed are combined by the modulo-two adder 22 with the received redundancy stream $R^{(3)}$ to form the syndrome stream S. The syndrome stream is passed through the syndrome storage register consisting of the cascade of delay devices 23, 24, 25, 26 and 27 which stores the most recently formed 5L digits in the syndrome stream. The digits in the syndrome stream are denoted by $s_0$, $s_1$, $s_2$, etc. where the subscript denotes the time unit at which the syndrome digit is formed by modulo-two adder 22. The output line 28 of modulo-two adder 22 and the taps 29, 30, 31, 31, and 33 along the syndrome register are labelled with the syndrome digit which they carry at time unit 5L which is the time unit at which the decoder must determine the error components of the digits received at time unit 0.

Figures 3, 4:
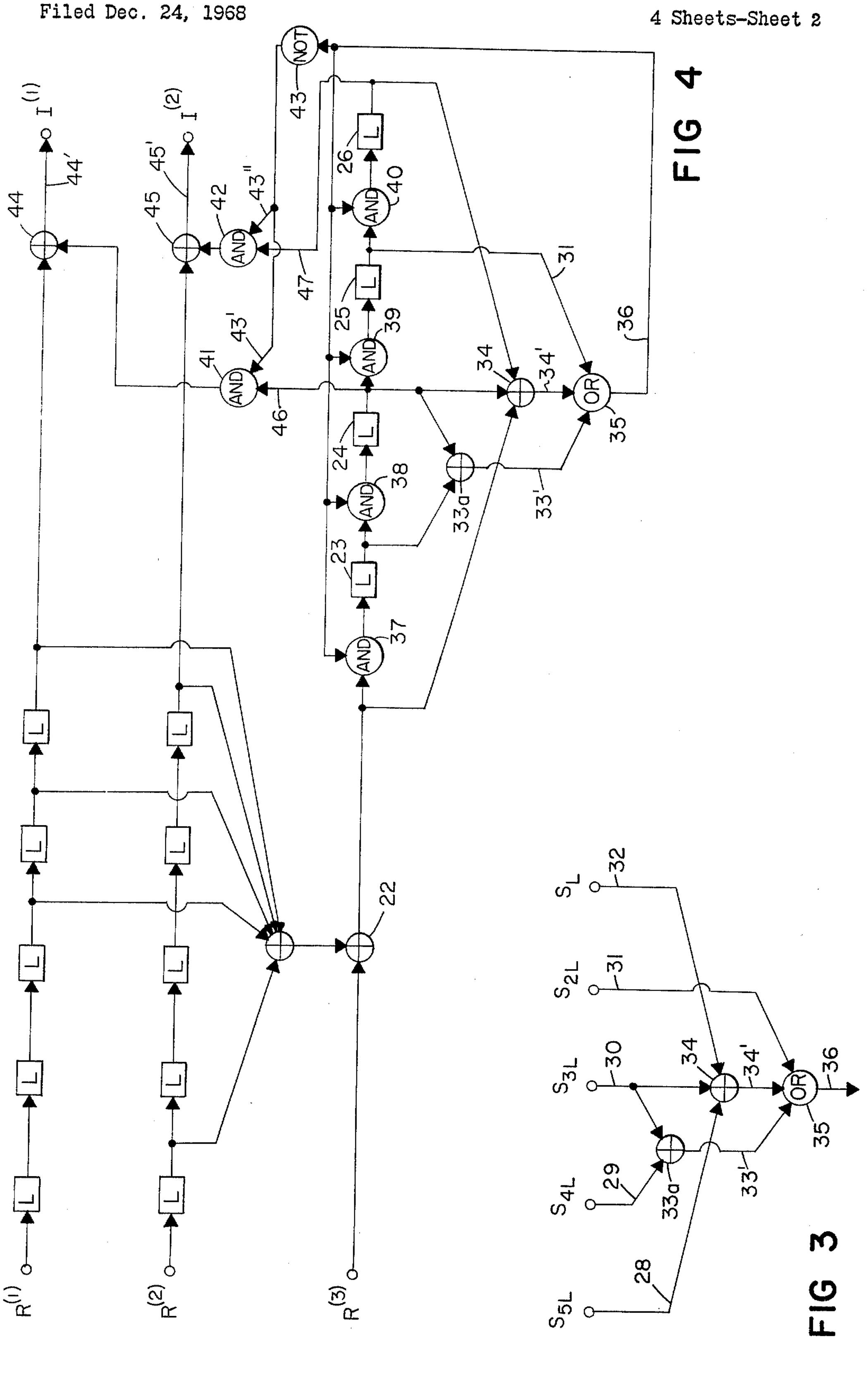
FIG. 3 is a diagram of a parity checking circuit for determining the presence of a codeword in the block linear code determined by the convolutional code of FIG. 1.
FIG. 4 is a diagram of a complete decoder for the convolutional code of FIG. 1.

FIG. 3 shows a parity-checking circuit for determining whether the syndrome vector $[s_O, s_L, s_{2L}, s_{3L}, s_{4L}, s_{5L}]$ consisting of 6 of the digits formed by the circuit of FIG. 2 forms a codeword in a linear block code dependent on the convolutional code defined by the encoder of FIG. 1. Tap 31, output line 33' from modulo-two adder 33*a*, and output line 34' from modulo-two adder 34 each provide a parity-check signal which must be zero when a block codeword is present. Output line 36 from OR gate 35 will then carry a zero output when and only when a block codeword is present.

FIG. 4 shows a complete decoder for the convolutional code defined by the encoder of FIG. 1. The complete decoder is formed by combining the syndrome forming circuit of FIG. 2 with the parity-checking circuit of FIG. 3 and introducing some necessary controlling logic whose function will subsequently be explained.

As is well known, the digits in the syndrome stream of a convolutional code depend only on the error components of the received digits and not at all on the actual values of the transmitted digits. The error components will be denoted by the symbol $e_u^{(j)}$ where the subscript $u$ specifies the time unit and the superscript $j$ specifies the stream of the corresponding digit. For example, $e_1^{(2)}$ is the error component of the received digit at time unit 1 in the second received stream $R^{(2)}$. The error component is 0 or 1 according as the received digit is correct or erroneous.

Examination of the taps leading to modulo-two adder 22 in the syndrome forming circuit of FIG. 2 reveals that the syndrome terms are described by the following equations in terms of the error components:

$$\begin{aligned}
s_0&=e_0^{(3)}\\
s_L&=e_0^{(2)}+e_L^{(3)}\\
s_{2L}&=e_L^{(2)}+e_{2L}^{(3)}\\
s_{3L}&=e_{2L}^{(2)}+e_0^{(1)}+e_{3L}^{(3)}\\
s_{4L}&=e_{3L}^{(2)}+e_L^{(1)}+e_0^{(1)}+e_{4L}^{(3)}\\
s_{5L}&=e_{4L}^{(2)}+e_0^{(2)}+e_{2L}^{(1)}+e_L^{(1)}+e_0^{(1)}+e_{5L}^{(3)} \quad (1)
\end{aligned}$$

where the + sign denotes modulo-two addition.

Let it be assumed that errors fall at most in the first L time units of the constraint length of the code, that is, that any error components which are non-zero have subscripts in the range 0, 1, . . . L–2, L–1. Under this assumption, Equations 1 reduce to $$\begin{aligned} s_0 &= e_0^{(3)} \\ s_L &= e_0^{(2)} \\ s_{2L} &= 0 \\ s_{3L} &= e_0^{(1)} \\ s_{4L} &= e_0^{(1)} \\ s_{5L} &= e_0^{(2)} + e_0^{(1)} \end{aligned} \qquad (2)$$

It will now be seen from the above simple example what is true generally, that when the error pattern is a correctable error-burst at the beginning of the constraint length then certain syndrome terms and certain linear combinations of syndrome terms must equal zero. That is, the syndrome terms must satisfy certain parity checks. In the example, this set of parity checks is $$\begin{aligned} s_{2L} &= 0 \\ s_{3L} + s_{4L} &= 0 \\ s_L + s_{3L} + s_{5L} &= 0 \end{aligned} \qquad (3)$$

Referring again to FIG. 3, it will be seen that each of the inputs to the OR gate 35 is directly equal to one of the parity sets specified in Equations 3 and hence the output line 36 from OR gate 35 carries a zero signal when and only when the three parity checks in Equations 3 are satisfied.

Furthermore it can be seen from the above simple example what is also true generally, that under the same assumption that the error pattern is a correctable error-burst at the beginning of the constraint length then the values of the error components for the digits at the beginning of the constraint length can be immediately determined from the syndrome terms. In the example, the rules are immediately seen from Equations 2 to be $$\begin{aligned} e_0^{(1)} &= s_{3L} \\ e_0^{(2)} &= s_L \\ e_0^{(3)} &= s_0 \end{aligned} \qquad (4)$$

Adding of the error components modulo-two to the corresponding received digits removes the effects of the error. In particular, when the error component has value 1, an actual error is corrected.

The decoder of FIG. 4 is constructed to effect decoding according to the rules derived above. It is assumed here that the digits in the redundancy sequence $T^{(3)}$ are not required at the decoder output. It will be noted from Equations 3 and 4 above that $s_0$ serves only to determine the error component $e_0^{(3)}$ for the redundancy stream and does not at all serve to signal the presence of a correctable burst. Realization of this fact allows one to eliminate delay device 27 of the syndrome register in FIG. 2 from the syndrome register in FIG. 4 consisting of the cascade of delay devices 23, 24, 25 and 26.

Conducting lines 33′, 34′ and 31 in FIG. 4 each carry the value of one of the parity sets specified in Equations 3. Output line 36 of OR gate 35 then carries a zero output only when these three parity checks are satisified, that is only when it has been determined that the possible error-burst is correctable. Moreover, output lines 43′ and 43″ of NOT gate 43 carry a 1 signal when output line 36 carries a 0 signal.

Taps 46 and 47 from the syndrome register in FIG. 4 respectively carry the decoded values of $e_0^{(1)}$ and $e_0^{(2)}$ when the error pattern is correctable. Output line 43′ from NOT gate 43 serves with AND gate 41 to cause the error component signal on tap 46 to be applied to modulo-two adder 44 for the removal of the error component from the received digit only when the NOT gate output is a 1. Similarly, output line 43″ from NOT gate 43 serves with AND gate 42 to cause the error component signal on tap 47 to be applied to modulo-two adder 45 only when the NOT gate output is a 1. Output lines

44′ and 45′ of modulo-two adders 44 and 45 thus carry the decoded information streams $I^{(1)}$ and $I^{(2)}$.

In order to make the decoder work correctly for subsequent instants of time, it is necessary to reset the syndrome storage register to take into account any errors that have been corrected in the time-unit-zero information digits. Another feature of this invention is the recognition that this syndrome reset for interlaced codes can be accomplished simply by setting to zero those syndrome digits which are examined by the parity checking circuit whenever this examination reveals the possible presence of an error-burst at the beginning of the constraint length. It can be seen from Equations 2 above what is true generally that after the time-unit-zero errors are corrected, that is, after any error components with value 1 have been changed in value to 0, then all the syndrome digits which were examined by the partity checking circuit should properly have value 0 also. This particular feature of interlaced error-burst-correcting decoders for interlaced codes is markedly different from the customary manner of syndrome reset in decoders for binary convolutional codes which consists of adding a 1 modulo-two to every syndrome term which includes an error component that has been changed from 1 to 0 by the decoding operation.

Syndrome reset in the decoder of FIG. 4 is accomplished by feeding the output of the parity checking circuit from OR gate 35 along line 36 to AND gates 37, 38, 39 and 40. Since the output of OR gate 35 is a 1 except when the error pattern is correctable, it follows that the presence of AND gates 37, 38, 39 and 40 does not affect the functioning of the syndrome register except when the error-burst is correctable. When the burst has been determined correctable, the output of OR gate 35 is a 0 which causes the outputs of AND gates 37, 38, 39 and 40 also all to be zeroes which has the effect of forcing to 0 those syndrome digits $s_{2L}$, $s_{3L}$, $s_{4L}$ and $s_{5L}$ which had been examined by the parity checking circuit, whether or not an actual error was detected and corrected. Thus the block diagram of FIG. 4 constitutes a complete decoder for the redundancy ⅓ interlaced binary error-burst-correcting code encoded by the encoder of FIG. 1.

Although the decoder of this invention is designed primarily for the correction of bursts of errors, it should be emphasized that the decoder also provides a certain degree of protection from random errors, that is those errors that occur at independent time instants on the channel, or scattered errors as they are sometimes called. For example, the decoder of FIG. 4 will correct single random errors among 14 particular code positions and will correct some double and triple error patterns as well in these digits. If the decoder is operating at a time when the channel bit errors are random with one error per thousand digits on the average, then the decoder will act so as to reduce the error rate to about two erros per one hundred thousand in the decoded digits.

Although the decoder of FIG. 4 is designed to correct all error-bursts confined to L or fewer time units provided the burst is followed by an error-free guard space of 5L time units, it should be emphasized that the decoder will also correct many error-bursts confined to L or fewer time units even when there are some scattered errors in the following 5L time units. For instance, if the burst contains no errors at time unit 3 but includes some errors in all of the time units 0, 1, 2, 4, 5 . . . $L-1$, then scattered errors in time unit $2L+3$ will not cause a decoding failure. Such considerations are of practical importance since many burst conditions on actual channels result in no more than about 1 error in 10 bits during the duration of the burst and the interval between bursts is often not absolutely error-free but may contain about 1 error per hundred thousands bits.

Concerning still FIGS. 1–4, it is usually convenient to have all the input data to the encoder in the form of a single serial stream rather than in two separate streams as in FIG. 1 or in $N-1$ separate streams for a general convolutional code with redundancy $1/N$. Such serialization is easily accomplished by taking alternate digits in the serial stream as members of $I^{(1)}$ and $I^{(2)}$ respectively in FIG. 1, and by any convenient alternation of digits into $N-1$ separate streams for a general convolutional code with redundancy $1/N$. Similarly, the encoder output would ordinarily be serialized for transmission over a single channel by taking the first transmitted digit from $T^{(1)}$, the second from $T^{(2)}$, the third from $T^{(3)}$, the fourth from $T^{(1)}$, and so on. Similarly, the output of the decoder in FIG. 4 would ordinarily be converted to a single serial stream by taking the first digit from $I^{(1)}$, the second from $I^{(2)}$, the third from $I^{(1)}$, and so on. When such serialization is employed, the two parallel registers in each of FIG. 1 and FIG. 4 might be constructed electronically as a single serial register with the even and odd positions respectively along the serial register corresponding to the first and second parallel registers.

The fact, as shown in Equation 4, that the error components of the digits at the beginning of the constraint length are directly equal to individual terms of the stored syndrome stream is not a peculiar feature of the convolutional code used in the example to embody the invention, but can always be obtained for any error-burst-correcting convolutional code by changing, if necessary, the encoding rules for the convolutional code in such a way that the error-burst-correcting power of the code is not impaired thereby. The manner in which this can be accomplished for a general code will be made clear in the subsequent discussion relating to the application of the invention to a general error-burst-correcting convolutional code.

The invention has particular importance with regard to interlaced codes as illustrated in FIGS. 1–4. For such codes the taps as in FIG. 1 which define the code structure are spaced apart by integral multiples of the maximum probable burst length L of the channel. For such codes, the decoder as in FIG. 4 is especially simple to construct because the number of syndrome digits which the parity checking circuit must examine can be made as small as theoretically possible for a given guaranteed burst correcting ability. Such interlaced coding systems are capable of correcting some bursts of length beyond the guaranteed correctable length. In some cases, however, a greater capability for correcting bursts beyond the guaranteed correctable length can be achieved through the use of codes which are not interlaced.

Figure 5:
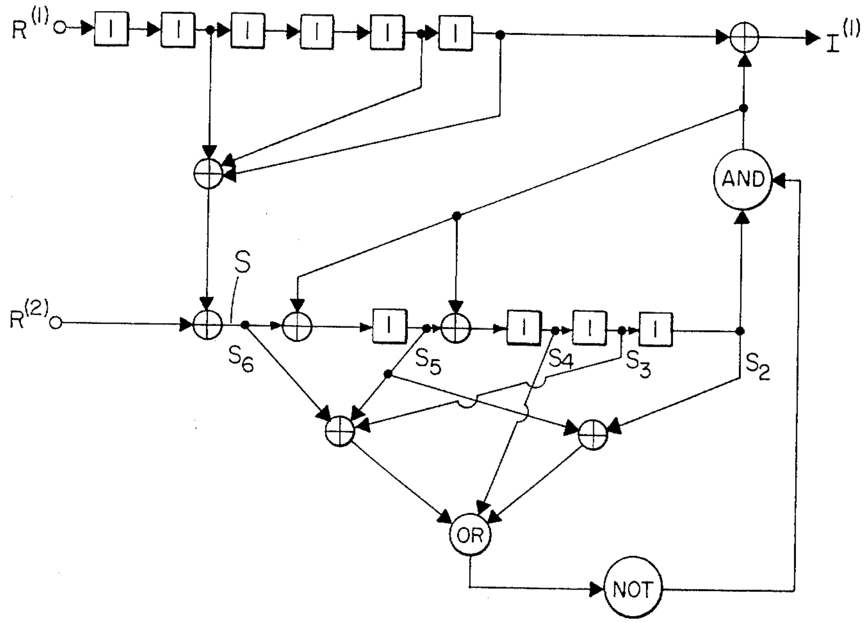
FIG. 5 is a diagram of a complete decoder for a redundancy ½ non-interlaced binary convolutional code.

FIG. 5 shows a decoder for a non-interlaced binary convolutional code of redundancy ½ designed to correct all error-bursts of length two or fewer time units followed by an error-free guard space of six time units, the theoretical minimum.

Although the invention was explained in terms of a binary convolutional code, it will be clear to one skilled in the coding art that it applies equally well to convolutional codes in which the digits are members of the type of digital number system known mathematically as a finite field. Such a number system contains $p^m$ different digits where $p$ is a prime and $m$ is any positive integer. The general case differs from the binary case (that is, the case when $p=2$ and $m=1$) only in the rules by which the result of a particular multiplication or addition of digits is determined. These rules may be found in any standard textbook on modern algebra such as G. Birkhoff and S. MacLane, "A Survey of Modern Algebra," Macmillan Co., New York 1941. The design of logical circuitry to perform operations in these finite fields is a straightforward process and may be found in the literature in such papers as T. Bartee and D. Schneider, "Computation with Finite Fields," Information and Control, vol. 6, pp. 79–98, 1963.

Figure 6:
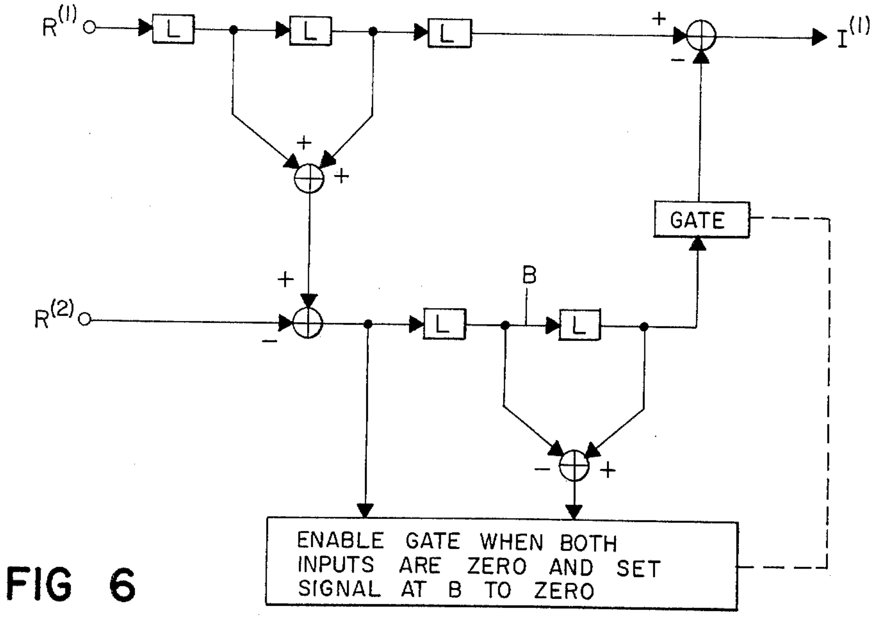
FIG. 6 is a diagram of a complete decoder for a redundancy ½ interlaced five-ary convolutional code.

FIG. 6 shows a decoder for a convolutional codes whose digits lie in the finite field with $p=5$ and $m=1$, i.e., a five-ary convolutional code. The adding circuits in this figure have an output equal to the remainder when the ordinary arithmetic sum of the inputs is divided by 5. The decoder of FIG. 6 corrects all error-bursts of length L or fewer time units followed by an error-free guard space of 3L time units, the theoretical minimum.

The following discussion deals more specifically with the application of the invention to arbitary convolutional codes of redundancy $1/N$, i.e., convolutional codes having $N-1$ informaton digits and 1 redundancy digit in each time unit. The manner of formation of the syndrome sequence for such codes is well known in the coding art. (See, for example, J. L. Massey, "Threshold Decoding," The M.I.T. Press, 1963.) The syndrome sequence for such a code contains one syndrome digit in each time unit. Let the parameter L for such a code be defined as the greatest common divisor of all those time units whose corresponding syndrome digit contains as a constituent the error component of any received digit from time unit zero. If L is two or more, then the code is said to be interlaced. If L is one, then the code is said to be non-interlaced. The constraint length of the code is said to be $mL+1$ time units where time units 0, 1, 2 . . . , $mL-1$, $m$L are the time units containing received digits which must be examined before the received digits from time unit 0 can be corrected.

Let it be assumed that a convolutional code is given which is capable of correcting all bursts over B or fewer time units followed by a guard space of $m$L time units. The design of the decoder according to the invention for such a code begins with the following general relationship:

$$[s_0, s_L, s_{2L}, \ldots s_{mL}] = \left[\frac{B}{L} N \text{ dimensional vector of error components over time unit } 0, L, 2L \ldots, B-L\right] [\text{tap matrix of convolutional code}] \qquad (5)$$

where the tap matrix of the convolutional code is defined as that matrix whose entry in row $i$ and column $j$ is equal to the value of the syndrome digit $s_{(j-1)L}$ when the $i$th error component in Equation 5 has value 1 and all other error components have value 0. The tap matrix is thus entirely determined by the syndrome forming circuit for the convolutional code.

For example, for the binary interlaced convolutional code with $m=5$, $N=3$, and $B=L$ associated with FIGS. 1–4, Equation 5 becomes $$[s_0, s_L, s_{2L}, s_{3L}, s_{4L}, s_{5L}] = [e_0^{(1)}, e_0^{(2)}, e_0^{(3)}] \begin{bmatrix} 0 & 0 & 0 & 1 & 1 & 1 \\ 0 & 1 & 0 & 0 & 0 & 1 \\ 1 & 0 & 0 & 0 & 0 & 0 \end{bmatrix} \qquad (6)$$

As a second example, for the non-interlaced binary convolutional code with $N=2$, $L=1$, $m=6$ and $B=2$, associated with FIG. 5, Equation 5 becomes $$[s_0, s_1, s_2, s_3, s_4, s_5, s_6] = [e_0^{(1)}, e_0^{(2)}, e_1^{(1)}, e_1^{(2)}] \begin{bmatrix} 0&0&1&0&0&1&1 \\ 1&0&0&0&0&0&0 \\ 0&0&0&1&0&0&1 \\ 0&1&0&0&0&0&0 \end{bmatrix} \qquad (7)$$

As a third example, for the interlaced five-ary convolutional code with $N=2$, $m=3$ and $B=L$, associated with FIG. 6, Equation 5 becomes $$[s_0, s_L, s_{2L}, s_{3L}] = [e_0^{(1)}, e_0^{(2)}] \begin{bmatrix} 0 & 1 & 1 & 0 \\ -1 & 0 & 0 & 0 \end{bmatrix} \qquad (8)$$

According to the invention, the error pattern evaluating unit of the decoder determines whether the vector of syndrome terms on the lefthand side of Equation 5 forms a vector in a particular linear vector space, or in more usual coding terminology whether this vector of syndrome terms is a codeword in a particular linear block code, determined by the convolutional code. This particular linear block code is the set of vectors obtainable as linear combinations of the rows of the tap matrix on the right-hand side of Equation 5.

A feature of this invention is the realization that the syndrome vector on the lefthand side of Equation 5 must be a codeword in the block code determined by the tap matrix, i.e., a linear combination of the rows of the tap matrix, whenever the actual channel error pattern is an error-burst confined to the time units 0, 1, 2 . . . B–1, since in this case Equation 5 is providing the true relation between the syndrome terms and the entire channel error pattern.

In coding terminology, the tap matrix defines a linear block code with codeword length $n=m+1$ and with $$k=\frac{B}{L}N$$

information positions. The vector of error components in Equation 5 serves as the $k$ digit information vector for this linear block code, and the vector of syndrome terms in Equation 5 serves as the corresponding codeword.

It is well known in the coding art that a vector can be tested unequivocally for membership in a given linear block code with block length $n$ and $k$ information positions by testing whether each of a set of $n-k$ independent linear combinations of digits from the vector have value 0. Each of these linear combinations of digits is called a parity check for the linear block code, and a circuit for testing whether all the $n-k$ parity checks have value 0 is called a parity checking circuit. The rules of construction for parity check circuits are straightforward and well known in the coding art. In accordance with the observations made above concerning Equation 5, a feature of this invention is the realization that a parity checking circuit for the linear block code defined by the tap matrix in Equation 5 may always be employed as the detecting unit of the decoder for an error-burst correcting convolutional code.

It is further well known in the coding art that once a vector has been identified as a codeword in a linear block code, then the unique values of the $k$ information digits which correspond to this codeword can each be obtained as a specified linear combination of the digits in the codeword. Moreover, it is well known that, without altering the set of codewords in the linear block code, the matrix which defines the code can always be chosen so that there is a set of $k$ positions in the codeword whose terms are directly equal to the $k$ information digits. A linear block code chosen in this latter form is said to be systematic, and the operation of altering the defining matrix to produce such a code is called the reduction to systematic form. A feature of this invention is the realization that the error-burst-correcting properties of the convolutional code depend only on the set of codewords in the linear block code defined by the tap matrix and not at all on the specific form of this tap matrix. Hence if a tap matrix is known in non-systematic form, the reduction to systematic form can be carried out to determine a new tap matrix in systematic form defining a new convolutional code with the same error-burst correcting properties as the former. This latter code has the desirable property that, once the detecting unit of the decoder has identified the syndrome vector on the lefthand side of Equation 5 as a valid codeword in the block code defined by the tap matrix, then the values of the error components at time unit zero are directly equal to specified syndrome digits. Hence the corrector unit of the decoder simply sets the values of the time unit zero error components directly equal to single syndrome digits.

Figure 7:
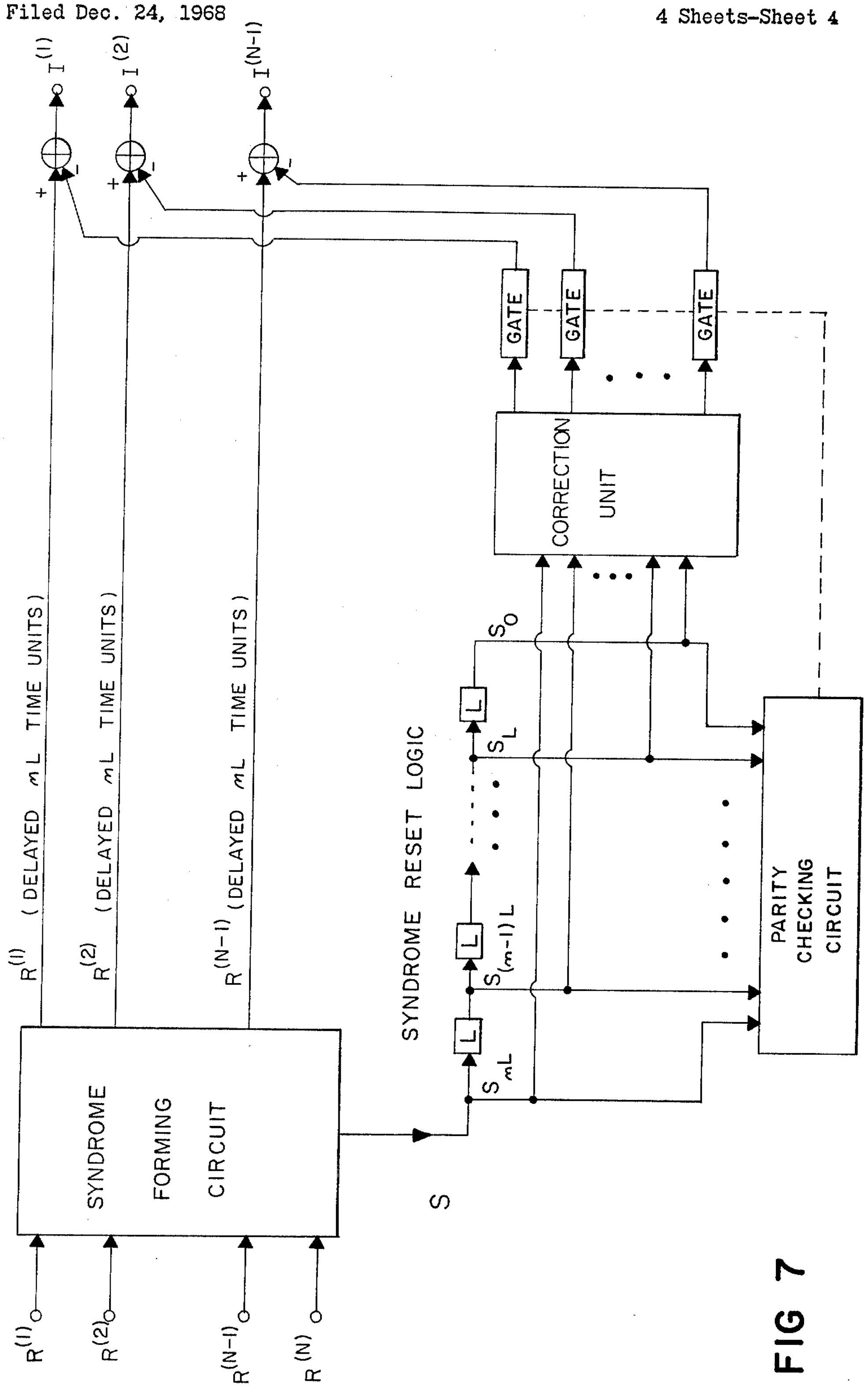
FIG. 7 is a schematic diagram of a complete decoder for a redundancy $1/N$ general error-burst-correcting convolutional code.

The structure of a general decoder according to the invention is shown in FIG. 7. The syndrome forming circuit generates the syndrome sequence S which is then stored in a syndrome storage register. The parity checking circuit enables gates connected to the output lines of the corrector unit to apply these outputs to the delayed received sequences whenever the parity checking circuit finds a syndrome vector in the linear block code defined by the convolutional code tap matrix. The corrector unit produces as its output the values of the error components of the $N-1$ information digits at the beginning of the constraint length under the assumption that a correctable burst has occurred. When the tap matrix of the convolutional code is chosen in systematic form, then each output of the corrector unit is directly equal to a single syndrome digit. FIG. 7 also shows the presence of the necessary syndrome reset logic required to remove the effect from the syndrome terms of any error components actually corrected by the decoder. For an interlaced code, this logic simply consists of that necessary to set to zero the value of all syndrome digits examined by the parity checking circuit. For the general case, this logic consists of the necessary circuitry to add out the value of the error component corrected from each syndrome digit containing that error component as a constituent.

Finally it will be noted that it is not intended that the examples and discussion should be taken to limit the applicability of the invention. Various modifications within the spirit and scope of the invention will occur to those skilled in the coding art.

What is claimed is:

1. A decoder for digital signals encoded by a convolutional code of redundancy $1/N$, the decoder capable of correcting any error-burst confined to B or fewer time units where each time unit contains $N-1$ received information signals and 1 received redundancy signal, comprising digital adding means responsive to the received signals for progressively forming the digital syndrome sequence that is characteristic of said convolutional code, digital delay means for storing the syndrome digits within the latest code constraint length of received digits, parity checking means responsive to digits in a set of selected locations of said digital delay means for determining whether the syndrome digits in said location form a codeword in a particular linear block code determined by said convolutional code, said linear block code having as its codewords the set of all digital patterns in said selected locations of said digital delay means that are consistent with any error burst being confined to the B time units at the beginning of the constraint length where correction is to be performed, error detector and corrector means responsive to said parity checking means upon the presence of a said codeword to decode digital signals at said beginning of said constraint length, and means to effectively compensate the syndrome digits in said selected locations of said digital delay means for said corrections to permit further decoding in sequential manner.

2. The decoder of claim 1 wherein said parity checking means comprises second digital adding means for forming a set of parity check signals from said syndrome signals, said second digital adding means including digital adder means to combine selected syndrome signals to form at least one of said parity check signals, and logical gating means responsive to said parity check signals to generate a signal, when all of said parity check signals have digital value zero, indicating the presence of a codeword in said linear block code.

3. The decoder of claim 1 wherein said convolutional code structure is chosen to produce at least one syndrome signal that has directly the decoding value of the error component of a digital signal being decoded when a codeword in said linear block code is detected by said parity checking means, said corrector means comprising gate means responsive to said parity checking means to permit said syndrome signal to decode said digital signal directly.

4. The decoder of claim 3 wherein said convolutional code is chosen so that it will have a corresponding tap matrix the rows of which define a systematic block code.

5. The decoder of claim 1 wherein said means to compensate said syndrome signals comprises means to set to zero, upon the presence of a said codeword and the operation of said detector and corrector means, the digital values of all syndrome signals to which said parity checking means is responsive; the set of taps defining the structure of said convolutional code are spaced apart by integral multiples of a time length L greater than the maximum probable error-burst length on the channel over which the digits are received; and said parity checking means is responsive only to syndrome signals also spaced apart by integral multiples of said time length L.

References Cited

UNITED STATES PATENTS

| | | | |
|---|---|---|---|
| 2,956,124 | 10/1960 | Hagelbarger | 340—146.1 X |
| 3,303,333 | 2/1967 | Massey | 235—153 |
| 3,439,334 | 4/1969 | Massey | 340—146.1 |

OTHER REFERENCES

Error Correcting Codes, William W. Peterson, The M.I.T. Press and John Wiley & Sons, Inc., 1961, pp. 217–235.

MALCOLM A. MORRISON, Primary Examiner

C. E. ATKINSON, Assistant Examiner

U.S. Cl. X.R.

235—153